March 17, 1931.                J. F. O'CONNOR                1,796,616
                                JOURNAL BEARING
                              Filed Sept. 17, 1927

Inventor
John F. O'Connor
By George L. Haight
His Atty.

Witness
Wm. Geiger

Patented Mar. 17, 1931

1,796,616

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

JOURNAL BEARING

Application filed September 17, 1927. Serial No. 220,096.

This invention relates to improvements in journal bearings.

An object of the invention is to provide an anti-friction bearing arrangement, more particularly adapted for use in connection with the journal boxes and journals of railway cars, and wherein an arrangement is provided which includes race-ways associated with the journal box and with the journal, between which are interposed an annular series of parallel rollers, together with a series of balls, each of which is disposed partially between the rollers for maintaining the same in proper alignment, said balls being yieldably urged to position to automatically assure proper engagement and to take up wear.

Other and further objects of the invention will more clearly appear from the description and claims hereinafter following.

In the drawings forming a part of this specification, Figure 1 is a side elevational view of a fragment of a railway car truck, showing a truck pedestal member and a journal box, embodying the invention, mounted in said pedestal member. Figure 2 is a transverse vertical sectional view corresponding substantially to the line 2—2 of Figure 1. And Figure 3 is a vertical sectional view, corresponding substantially to the line 3—3 of Figure 2.

As shown in the drawing, 10 represents a fragment of the body portion of the car truck and 11 represents a common type of pedestal member mounted thereon, having the usual spaced jaws between which is slidably disposed a journal box 12 embodying the invention. The numeral 13 indicates one end of an equalizer bar which bears upon the top of the journal box 12 and transmits the load from the frame of the truck to the top of the journal box, which in turn transmits the load to the axle.

The invention contemplates broadly the provision of a journal box A, journal box race member B, journal race rings C, anti-friction rollers D, aligning elements E, and resilient rings F.

The journal box A comprises side, top, bottom and rear walls, defining an annular recess 160, the rear wall having an annular aperture permitting the projection of the journal 14 into the recess 160 of the box, the edge of the wall defining the aperture having packing material 15 arranged in a groove therein. The top wall of the journal box A is provided with the usual spaced flanges 16—16, and an equalizer seat 17ª for the reception of the end of the equalizer bar 13. Fitted into the annular recess 160 of the journal box is a hardened annular bushing or liner which forms the journal box race member B. The open front end of the journal box is closed by means of a cap or cover 17. Said cap has an annular portion which is telescopically disposed within the annular recess 160 provided by the walls of the journal box. The cap 17 is also provided with flanges 18—18 through which bolts 19 are extended into the journal box for securing the cover B rigidly in position, the flanges 18 co-operating with the flanges 20 on the journal box A to provide guide means for maintaining the journal box in slidable relation with the jaws of the pedestal member 11.

The race rings C comprise an inner sleeve or collar 21, a central sleeve or collar 22, and an outer sleeve or collar 23, the collars 21, 22 and 23 being secured to the journal 14, and the collars 21 and 23 spaced from the opposite edges of the central collar 22. The outer end of the journal 14 is provided with a reduced portion 24, which is threaded for the reception of a nut 25, which holds a washer 26 in position, the latter bearing upon the outer ring 23.

Interposed between the annular race member B and the outer circumferential surfaces of the sleeves 21, 22 and 23, are the anti-friction rollers D. Each of these rollers is of elongated cylindrical formation, and adjacent each end, each roller is provided with an annular groove 27 adapted for co-operation with the balls E.

The balls E are arranged between the cylindrical sleeve member 22 and the outer sleeve members 21 and 23, as best shown in Figure 2, and are arranged in two annular series in such manner that each ball of each series projects into one of the grooves 27 between adjacent pairs of rollers, as best shown in Figure 3, whereby said rollers are maintained in a certain definite position and are held against longitudinal or lateral displacement.

The balls E are maintained snugly in position by use of the resilient means F, comprising rings 28, one of which is disposed in the space between the outer sleeve 23 and the central sleeve 22, while the other is disposed between the central sleeve 22 and the inner sleeve 21, as best shown in Figure 2, each of the rings 28 being of resilient material, and of such diameter and thickness as to be spaced from the journal 14 and to bear upon the balls E, so that said rings urge the balls into their positions between the rollers D, the rings being carried by the balls clear of the journal 14.

In assembling the construction, the journal box A, with its race member B, is first placed in position upon the axle. The sleeves 21, 22 and 23, balls E, rings 28 and rollers D are then placed in position between the journal and the race member B, after which the washer 26 and nut 25 are applied, and the cap 17 secured to the journal box.

By the above described arrangement, it will be appreciated that the rollers D are held against both longitudinal and lateral displacement, and the means by which this is accomplished, namely, the balls and associated parts, are of such character that the resilient rings at all times urge the balls to engaged position, while the latter and said rings are maintained against displacement by the sleeves 21, 22 and 23.

While I have herein shown and described what I consider the preferred manner of carrying out the invention, the same is merely illustrative, and I contemplate all changes and modifications which come within the scope of the claims appended hereto.

I claim:

1. In a construction of the character described, the combination with a journal; of a plurality of sleeves fixed on said journal, said sleeves being arranged to provide annular runways therebetween; a journal box having means providing a race disposed about and spaced from said sleeves; a series of spaced anti-friction rollers interposed between said race and said sleeves, said anti-friction rollers being provided with circumferential grooves; annular series of balls mounted within the spaces between said sleeves and disposed in the grooves in said rollers, said balls being of a diameter greater than the distance between the grooved sections of two adjacent rollers; and means for yieldably maintaining said balls in operative engagement with said rollers.

2. In a construction of the character described, the combination with a journal; of a plurality of sleeves fixed on said journal, said sleeves being arranged to provide spaces therebetween; a journal box having means providing a race disposed about and spaced from said sleeves; a series of spaced anti-friction rollers interposed between said race and said sleeves, said anti-friction rollers being provided with circumferential grooves; annual series of balls mounted within the spaces between said sleeves and engaging within the grooves of adjacent rollers to hold said rollers spaced, said balls being of greater size than the space between the grooves of two adjacent rollers; and means for yieldably maintaining said balls in operative engagement with said rollers, comprising a plurality of rings disposed in the spaces between said sleeves and engaging said balls, to force the same radially outwardly.

In witness that I claim the foregoing I have hereunto subscribed my name this 14th day of September, 1927.

JOHN F. O'CONNOR.